United States Patent [19]

Ban

[11] Patent Number: 5,615,339
[45] Date of Patent: Mar. 25, 1997

[54] ONLINE SYSTEM HAVING SESSION CONTROL INFORMATION TABLE IN A HOST COMPUTER FOR ESTABLISHING OR DISCONNECTING SESSION WITH MULTIPLE TERMINALS IN ACCORDANCE WITH PROCESSING PERFORMANCE

[75] Inventor: Takayuki Ban, Tokyo, Japan

[73] Assignee: NEC Corporation, Tokyo, Japan

[21] Appl. No.: 839,541

[22] Filed: Feb. 24, 1992

[30] Foreign Application Priority Data

Feb. 22, 1991 [JP] Japan ................................. 3-050766

[51] Int. Cl.$^6$ ................................................. G06F 13/00
[52] U.S. Cl. .............................. 395/200.12; 395/200.02; 395/200.05; 395/200.06
[58] Field of Search ................................. 395/200, 250, 395/275, 650, 200.12, 200.02, 200.05, 200.06

[56] References Cited

U.S. PATENT DOCUMENTS

| | | | |
|---|---|---|---|
| 4,348,739 | 9/1982 | Deaver et al. | 364/900 |
| 4,503,499 | 3/1985 | Mason et al. | 364/200 |
| 4,586,134 | 4/1986 | Norstedt | 364/200 |
| 5,043,881 | 8/1991 | Hamazaki | 364/200 |
| 5,165,020 | 11/1992 | Sudama et al. | 395/200 |
| 5,191,651 | 3/1993 | Halim et al. | 395/200 |
| 5,276,879 | 1/1994 | Barry et al. | 395/650 |
| 5,392,426 | 2/1995 | Urbanski et al. | 395/650 |

*Primary Examiner*—Thomas C. Lee
*Assistant Examiner*—Le Hien Luu
*Attorney, Agent, or Firm*—Foley & Lardner

[57] ABSTRACT

This online system has multiple terminals connected with a host computer through communication lines. The host computer includes an online information processing means for processing information by executing an online program, a session control means for setting/disconnecting processing of the session with the above multiple terminals, and a session control information table for storing information needed for setting/disconnecting the session. The session control information table has an information area to store the logical address of the other terminal and information to indicate the session state with the applicable other terminal. The session control means, based on the message of session setting/disconnecting request sent from the online information processing means or terminal, sets/disconnects the session with reference to the information area of the session control information table. It also stores the state of the logical address and session of the other terminal contained in the message at the time of setting/disconnecting of the session, into the information area of the session control information table.

11 Claims, 10 Drawing Sheets

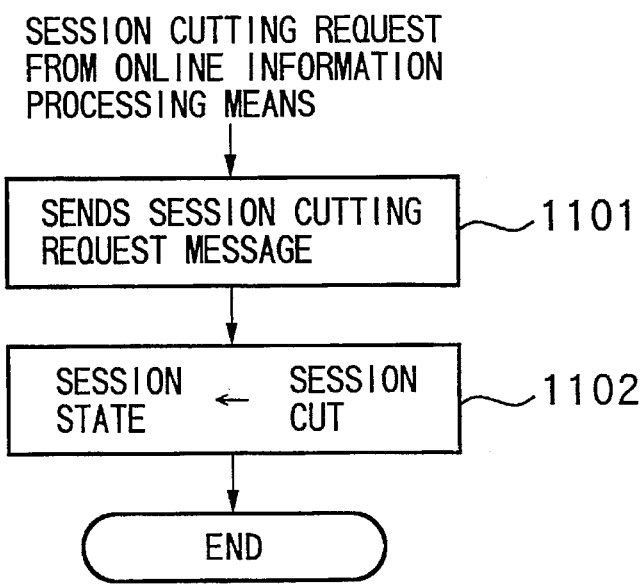
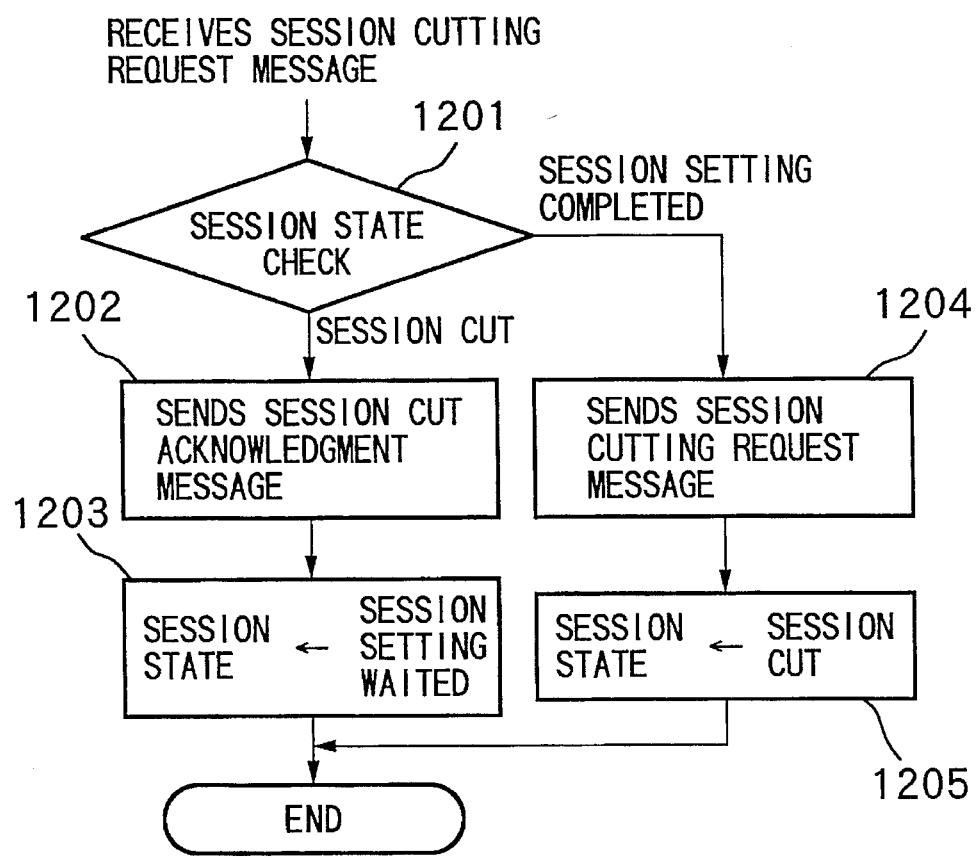

ONLINE SYSTEM HAVING SESSION CONTROL INFORMATION TABLE IN A HOST COMPUTER FOR ESTABLISHING OR DISCONNECTING SESSION WITH MULTIPLE TERMINALS IN ACCORDANCE WITH PROCESSING PERFORMANCE

BACKGROUNDS OF THE INVENTION

1. Field of the Invention

This invention relates to online information processing, particularly to an online system which can dynamically set logical data pass (hereinafter called "session") multiplexed on a data link as required.

2. Description of the Prior Art

In a conventional online system which processes information online with multiple terminals connected to a host computer via communication lines, to set sessions between the host computer and a terminal, the logical address of a terminal that is needed to identify a session multiplexed on a data link has been statistically given in advance.

As it is necessary to statistically give another logical address for identifying the session multiplexed on a data link, online information processing has to be stopped for the addition of a terminal or alternation of another terminal's logical address, lowering the operation efficiency of the system. For every terminal having a session set, it is necessary to store the logical address as the session control information required for setting and disconnecting the session. Therefore, to its disadvantage, it requires a large volume of memory.

SUMMARY OF THE INVENTION

An object of this invention is to provide an online system capable of improving operating efficiency by eliminating the necessity of stopping the system when a terminal is added or another terminal's logical address is altered.

Another object of this invention is to provide an online system capable of decreasing the amount of memory required for storing session control information.

The online system according to a preferable embodiment of this invention to accomplish the above objects consists of a host computer and multiple terminals connected with the host computer through communication lines. This host computer includes an online information processing means to execute the online program for information processing, a session control means to set or disconnect the session with multiple terminals, and a session control information storage means to store information needed for setting or disconnecting the session. The session control information storage means has an information area to store information showing the session state and the logical address of the terminal. The session control means, based on a message requesting session setting or disconnecting which is sent from the online information processing means or the terminal, sets or disconnects the session referring to the information area of the session control information storage means. It also stores the session state and logical address of the terminal, contained in the above message when setting or disconnecting the session, in the information area of the session control information storage means.

In a preferable embodiment, the above session control means consists of a session setting/disconnecting means for setting or disconnecting the session based on the session setting or disconnecting request from the online information processing means or terminal, a message sending/receiving means for sending/receiving a message to effect the session setting/disconnecting request against the online information processing means or the terminal, a reference means for referring the terminal's logical address and session state stored in the information area of the above session control information storage means when setting or disconnecting the session, a logical address setting means for storing the terminal's logical address contained in the above message when setting the session into the information area of the session control information storage means, and a session state setting means for setting a session state of the terminal in the information area of the session control information storage means.

In another preferable embodiment, the information area of the session control information storage means is characteristically set in numbers equivalent to the session numbers which can be set at the same time. And, the information area of the above session control information storage means is characterized by being formed of an area storing a session state and an area storing a logical address.

Further, the message is characterized by consisting of a sender logical address section for storing the logical address of a terminal to be a sender, a receiver logical address section for storing the logical address of a terminal to be a receiver, and a message type section for storing the type information of a message. The session state setting means of the session control means sets the session states such as a session setting waiting, session under setting, session setting completed, and session disconnect in the information area of the above session control information storage means.

The online system, according to another preferable embodiment of this invention, consists of a host computer and multiple terminals connected with the host computer through communication lines.

The above host computer has an online information processing means for processing information by executing the online program, a session control means for setting/disconnecting the session with multiple terminals, and a session control information storage means for storing information needed for setting/disconnecting the session.

The above session control information storage means has an area to store information indicating the logical address of another terminal and the session state with the applicable another terminal.

The above session control means has:

a means for referring to the session control information storage means for the presence of an unused information area when a message requiring a session setting is received from the online information processing means. This means also refers to the session control information storage means for the presence of an unused information area or for the presence of an information area storing the same logical address as that of another terminal contained in a session setting requesting message when a message requiring a session setting is received from the above terminal, a means for storing the logical address of another terminal contained in the session setting requesting message in an information area of the above session control information storage means when an unused information area exists. This also stores a state indicating that the session is under setting into the information area of the above session control information storage means, a means, when an unused information area does not exist or when the session state receives rejection of a session setting from the above online information processing means for the session setting information area, for informing the online information processing means or the above terminal about the rejection of a session setting, and a means for storing the state of session setting completed in an information area of the above session control information storage means when; there is an information area storing the same logical address as that of another terminal contained in a message requesting the session setting, or a message receiving the session setting from the above online information processing means to an information area whose session state is under session setting.

In a preferable embodiment, the above session control means includes a means for storing a state indicating a session being disconnected in an information area of the session control information storage means, a means for checking an information area of the session control information storage means when a message requesting session disconnecting is received from the above terminal for making the session state into an unused state when the session state is under being disconnected, for making the session state to a session being disconnected state when the session state is in setting completed, and a means for making the session state of the applicable information area into an unused state when a message confirming a session disconnecting is received from the online information processing means.

The above session control means is provided with a means to make the session state into an unused state regardless of the session state of the information area when a failure occurs in the communication line.

BRIEF DESCRIPTION OF THE DRAWINGS

FIG. 11 shows a flowchart showing processing of the session control means for the session disconnecting request from the online information processing means.

FIG. 12 is a flowchart showing processing of the session control means when the session disconnecting request message is received from a terminal.

DESCRIPTION OF THE PREFERRED EMBODIMENT

Figure 1:
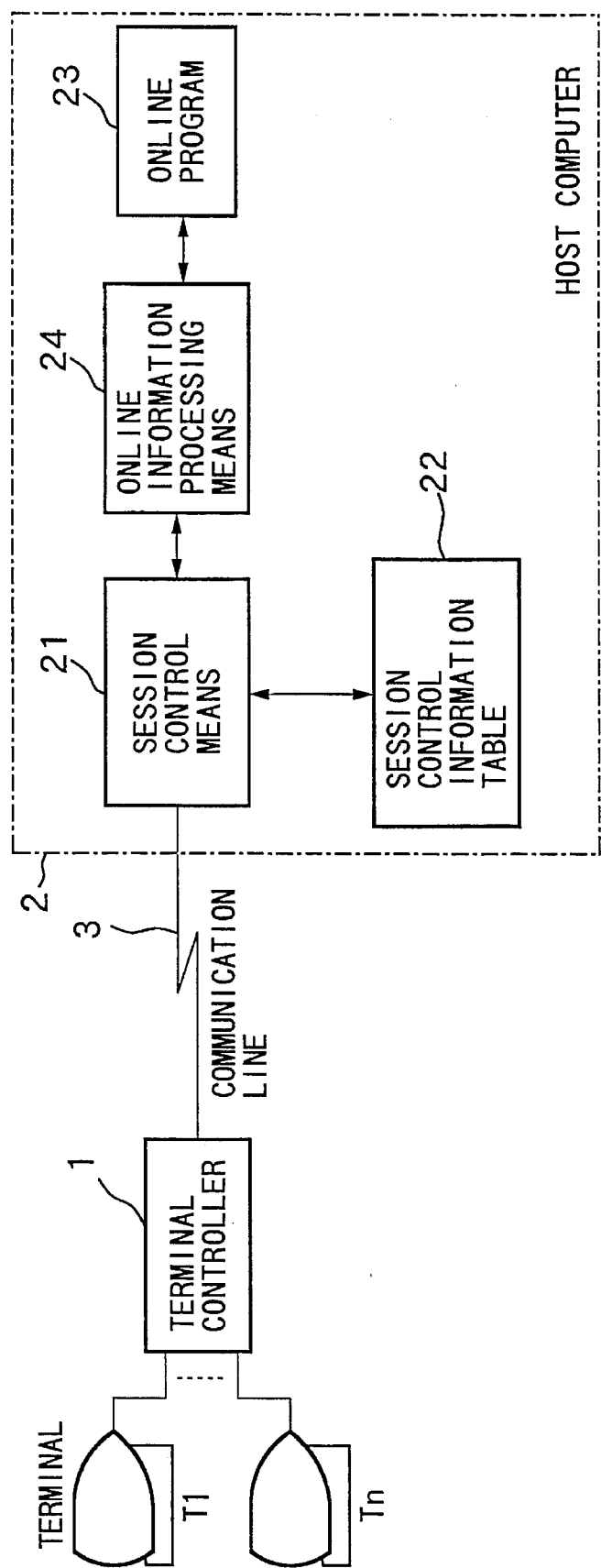
FIG. 1 is a block diagram showing a structure of the online system according to one embodiment of this invention.

A preferable embodiment of this invention will be described with reference to FIG. 1 and FIG. 2. FIG. 1 shows a configuration of the online system according to one embodiment of this invention. In FIG. 1, the online system of this embodiment consists of a host computer 2 and multiple terminals T1 to Tn connected with the host computer through a terminal controller 1 and communication line 3.

The host computer 2 includes an online information processing means 24 for effecting online information processing by executing an online program 23, a session control means 21 for effecting setting and disconnecting of sessions with terminals T1 to Tn, and a session control information table 22 for storing logical address identifying sessions multiplexed on a data link, session state and other information.

The session control means 21 effects setting and disconnecting processes of sessions with terminals T1 to Tn according to a predetermined protocol (for example, SNA etc.) The configuration of this session control means 21 is shown in the block diagram of FIG. 2.

Figure 2:
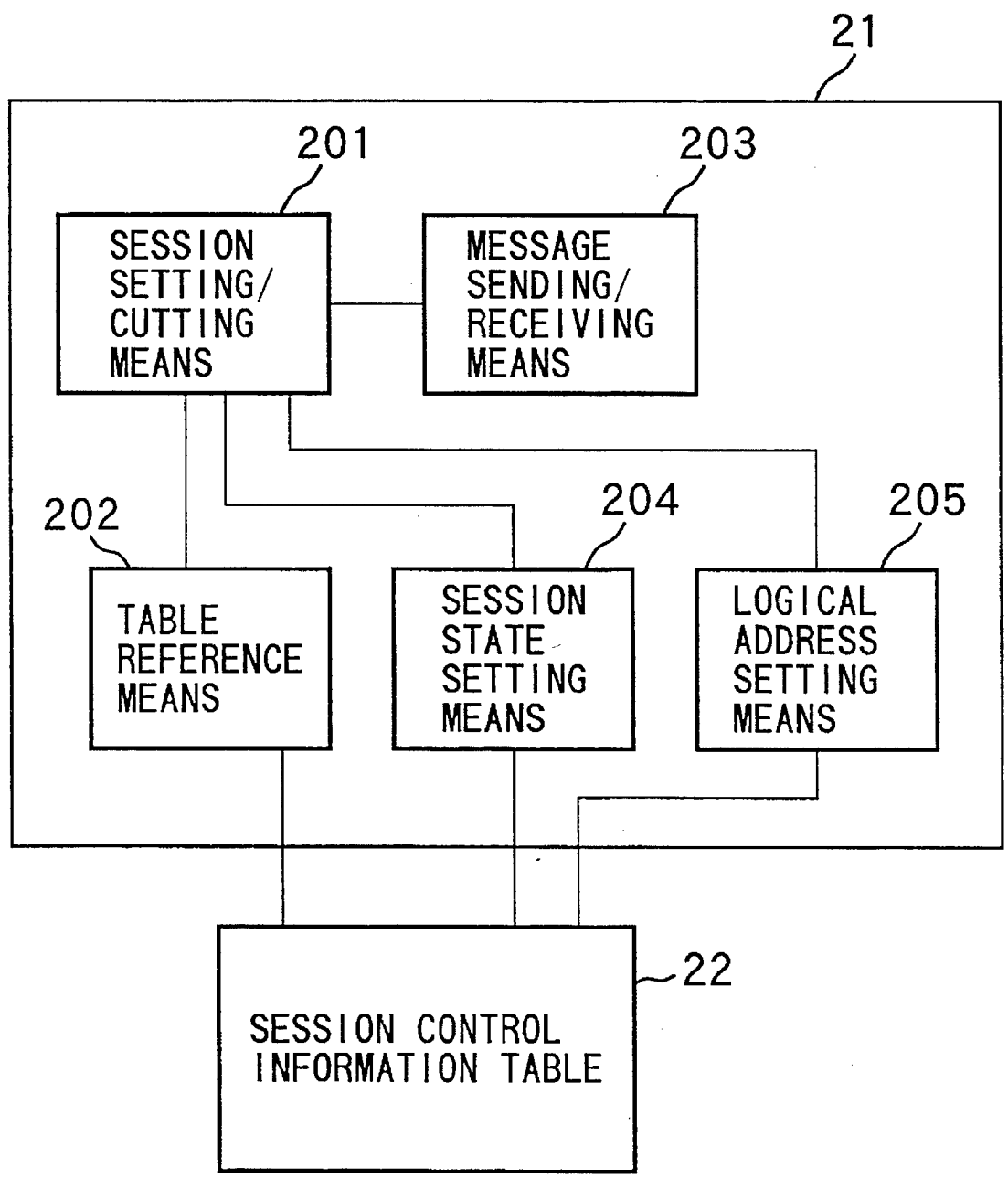
FIG. 2 is a block diagram showing a structure of the session control means of the online system shown in FIG. 1.

In FIG. 2, the session control means 21 is provided with; a session setting/disconnecting means 201 for setting and disconnecting a session with the terminals T1 to Tn, a table reference means 202 for referring the contents of the session control information table 22 when a session is set and disconnected, a message sending/receiving means 203 for sending/receiving a messages with the online information processing means 24 or terminals T1 to Tn when a session is set and disconnected, a session state setting means 204 for setting session state to be described hereinafter to the session control information table 22, and a logical address setting means 205 to set a logical address for a terminal T1 to Tn that sets a session in the session control information table 22.

Figure 3:
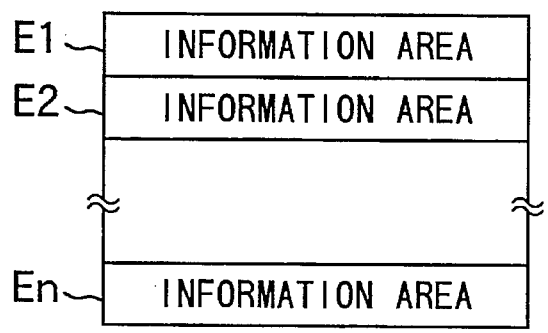
FIG. 3 is a diagram showing the configuration of the session control information table of the online system according to one embodiment of this invention.

FIG. 3 shows the configuration of session control information table 22. The session control information table 22 consists of multiple information areas E1 to En as shown in FIG. 3. The number of information areas E1 to En is equal to the maximum number of sessions that can be set simultaneously or the maximum number of sessions that are judged to be able to be set simultaneously based on the processing performance of the online information processing means 24 and other resources, including memory size (not shown) of the host computer 2. The information area E1 to En of the session control information table 22 is exclusively used by all sessions.

Figure 4:
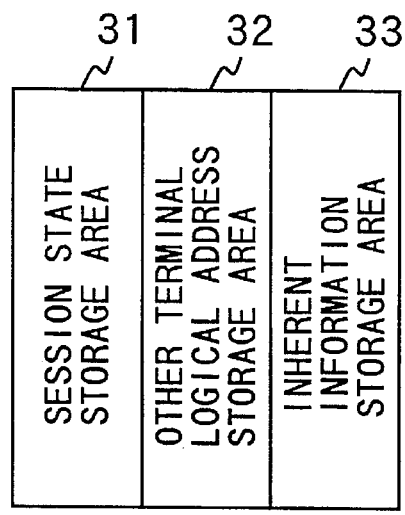
FIG. 4 is a diagram showing the configuration of information areas of the session control information table shown in FIG. 3.

FIG. 4 shows the above information areas E1 to En that make up the session control information table 22. The information areas E1 and En have a session state storage area 31, a terminal logical address storage area 32, and an inherent information storage area 33. The session state storage area 31 and the terminal logical address storage area 32 have session state and logical address stored as information by the session state setting means 204 and logical address setting means 205 of the session control means 21, respectively.

The session state storage area 31 stores information indicating a session setting waiting, session under setting, session setting completed, and session disconnected (these states are collectively called hereinafter "session state"). Here, the information areas E1 to En in which information in the session setting waiting state is stored are recognized as an unused state, and other information areas E1 to En in which information in other session states are stored are recognized as an in-use state.

The terminal logical address storage area 32 stores the logical address of terminals T1 to Tn. This is significant when the session state storage area 31 stores a state other than session setting waiting (that is to say, the session state is other than session setting waiting).

At the initial state of the system initialization, the inherent information storage area 33 of the information areas E1 to En is given with the same information by SG (System Generation). In the initial state such as system initialization or the like, the session state storage area 31 stores information of the session setting waiting state (unused state), and the terminal logical address storage area 32 does not store the logical address of the terminals T1 to Tn.

Figure 5:
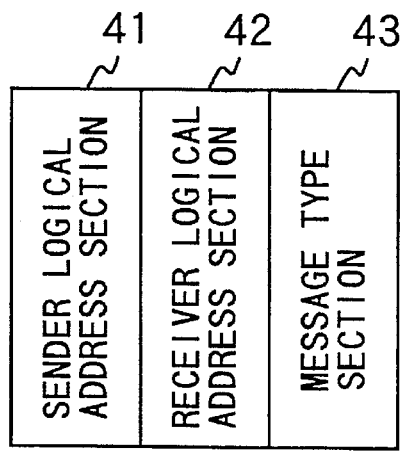
FIG. 5 is a diagram showing a format of the message used for setting/disconnecting processing of a session in the online system according to one embodiment of this invention.

FIG. 5 is a diagram showing a format of message sent/received between the session control means 21 and online information processing means 24 and terminals T1 to Tn in the setting and disconnecting processing of a session in this embodiment. A sender logical address section 41 has the logical address of a message sending terminal set or the host computer 2, and a receiver logical address section 42 has the logical address of a message receiver terminal set or the host computer 2. A message identification section 43 has the identification information of a message needed for setting or disconnecting of a session. As identification information, there is a session setting requesting message, a session setting receiving message, a session setting completion message, a session setting rejection message, a session disconnecting requesting message, and a session disconnecting acknowledgment message.

Figure 6:
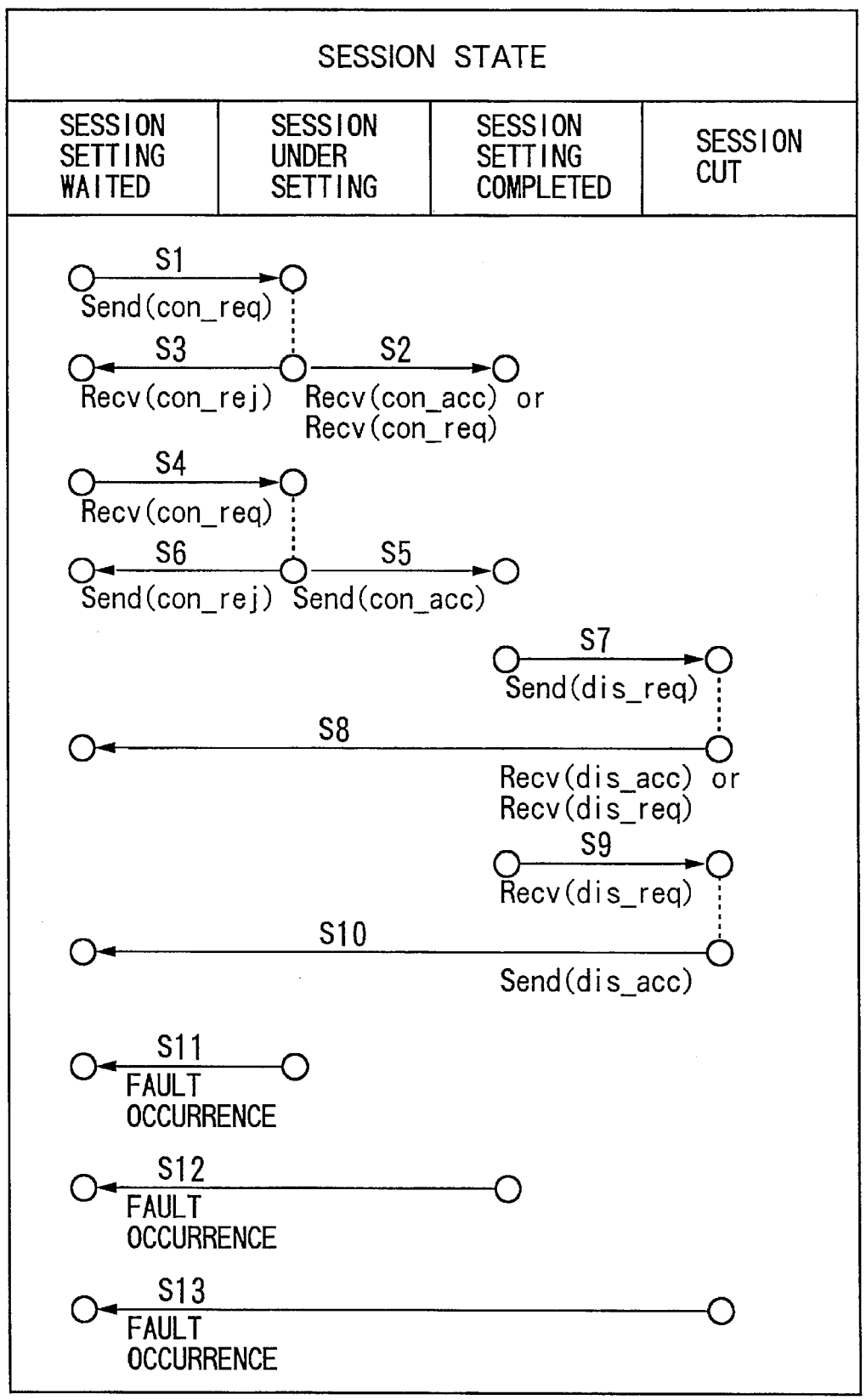
FIG. 6 is a diagram showing transition of the session state in the online system according to one embodiment of this invention.

Changes in the session state in the session setting and disconnecting processing will be described with reference to the state transition diagram of FIG. 6. The session state shown here is a session state stored in the session state storage area 31 of the information areas E1 to En shown in FIG. 4.

When a session setting request message (connect-request) or session setting accept message (connect-accept) is received (S2) from a terminal in response to the sending of a session setting request message (connect-request) (S1), the session falls into the session setting completion state. When a session setting rejection message (connect-reject) is received (S3), the session falls into the session setting waiting state. Upon receipt of the session setting request message (connect-request) from one of the terminals T1 to Tn (S4), when the session setting acceptance message (connect-accept) is sent (S5), the session changes to a session setting completion state. When the session setting rejection message (connect-reject) is sent (S6), the session changes into the session setting waiting state.

On the other hand, to the sending of a session disconnecting request message (disconnect-request) (S7), when the session disconnect request message (disconnect-request) or session disconnect acknowledgment message (disconnect-accept) is received from the terminal (S8), the session falls into the session setting waiting state. Upon receipt of the session disconnect request message (disconnect-request) from the terminal (S9), when the session disconnect acknowledgment message (disconnect-accept) is sent (S10), the session falls into the session setting waiting state. An occurrence of a line failure or link failure (S11, S12, S13) results in a session setting waiting state.

The session setting and disconnect processing by the session control means 21 will be described according to the flowcharts of FIG. 7 to FIG. 15.

Figure 7:
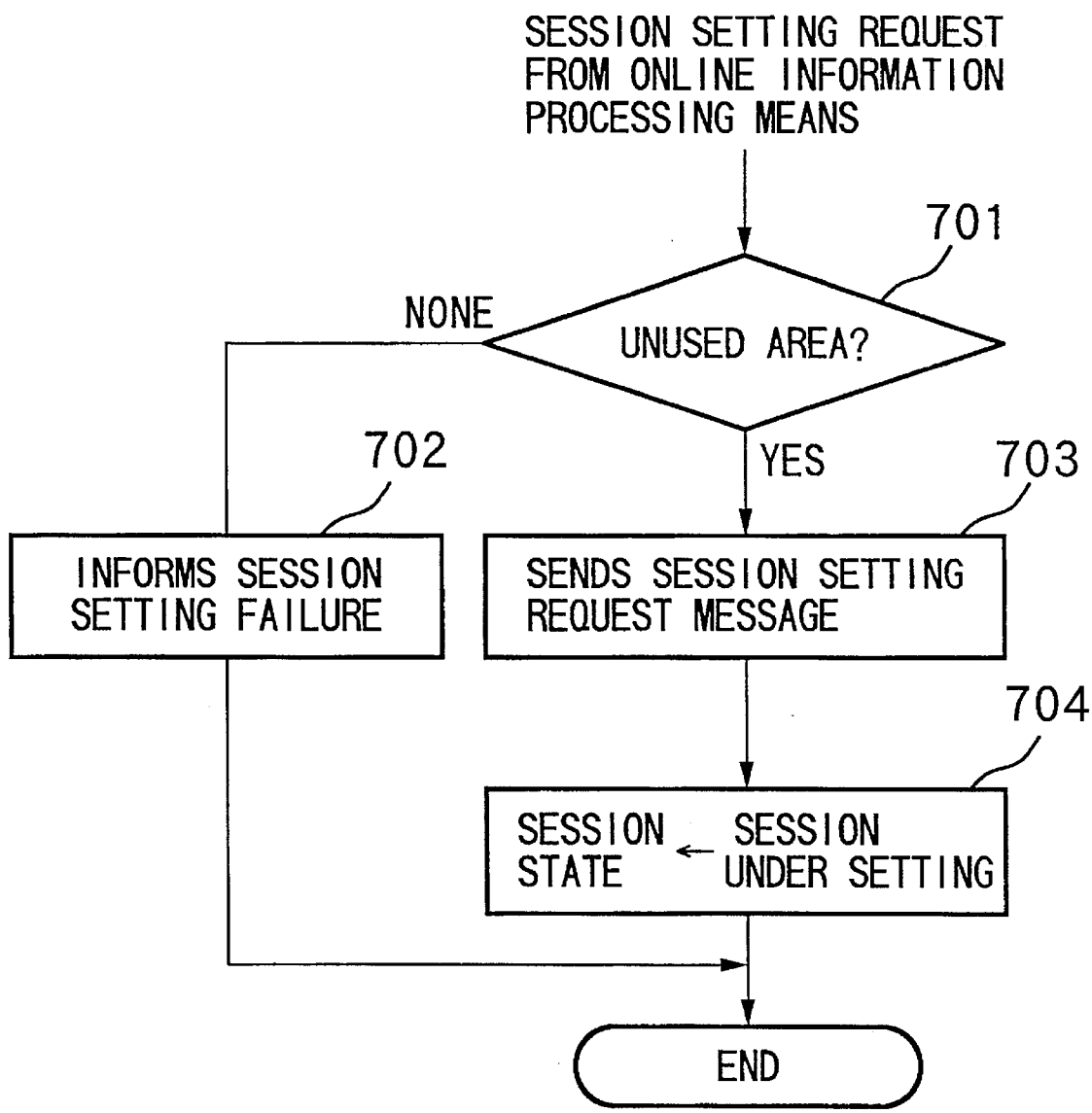
FIG. 7 is a flowchart showing processing of the session control means upon the session setting request from the online information processing means in the online system according to one embodiment of this invention.

First, FIG. 7 shows processing made when a session setting request is received from the online information processing means 24. When the session is set, the online information processing means 24 sends the session setting request message to the session control means 21. This message contains the logical address of terminals T1 to Tn which are to set the session, as designated by the receiver logical address section 42. Upon this session setting request, the session control means 21, with reference to session control information table 22, finds information areas E1 to En where the session state is in the session setting waiting state (unused state) (Step 701). If there is not an applicable area, the session setting rejection message is sent to inform the online information processing means 24 of the failure in session setting. The session setting request is then rejected (Step 702).

On the other hand, when there are information areas E1 to En in the unused state, the session control means 21 sets the logical address of one of the terminals T1 to Tn received at the time of the session setting request from the online information processing means 24 to the receiver logical address section 42 of the applicable terminal (Step 703). At the same time, the logical address of the applicable terminal is set in the terminal logical address storage area 32 of the applicable information areas E1 to En, and information showing the session setting state is set in the session state storage area 31 (Step 704).

Figure 8:
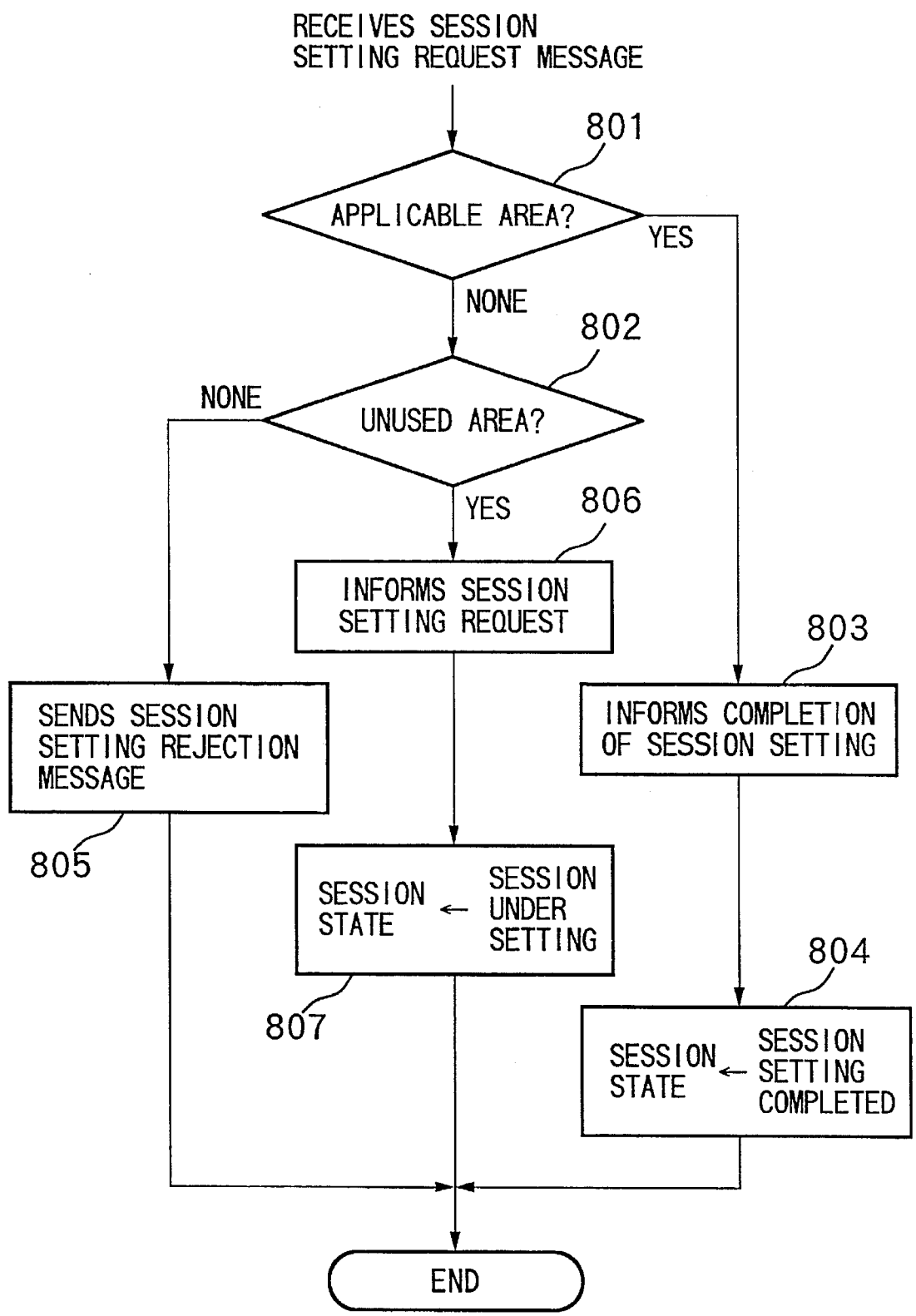
FIG. 8 is a flowchart showing processing of the session control means when the session setting request message is received from a terminal.

Then, FIG. 8 shows the processing of the session control section 21 when the session setting request message is received from terminals T1 to Tn. When the session setting request message is received from terminals T1 to Tn, the session control means 21 refers to the session control information table 22 and, from among information areas E1 to En that the session state storage area 31 is under session setting, retrieves an information area. This stores the logical address of a terminal equal to the logical address set in the sender logical address section 41 of the received session setting request message, in the terminal logical address storage area 32 (Step 801).

When information areas E1 to En are found, a session setting completion message is given to the online information processing means 24 (Step 803). The session setting completion state is set in the session state storage area 31 of the applicable information area (Step 804). When the applicable information area is not found in Step 801, information areas E1 to En of the session state storage area 31 that are in session setting waiting are found (Step 802). When information areas E1 to En under session setting waiting are not found, the session setting rejection message is sent back to the applicable terminal T1 to Tn which sent the session setting request message (Step 805).

When an information area under session setting waiting is found, the session setting request message with a logical address of the applicable terminable T1 to Tn set in the sender logical address section 41 of the received session setting request message is given to the online information processing means 24 (Step 806). At the same time, the above logical address is set in the terminal logical address area 32 of the applicable information area and also the state of the session state storage area 31 is set to the session setting state (Step 807).

Figure 9:
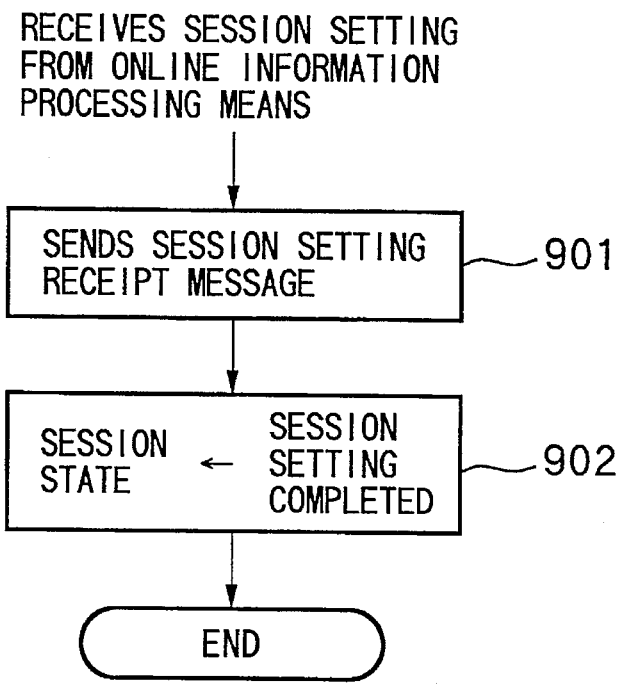
FIG. 9 is a flowchart showing processing of the session control means for the session receipt from the online information processing means.

FIG. 9 shows the processing of the session control means 21 when the session setting receipt is received from the online information processing means 24 which received the session setting request from the applicable terminal T1 to Tn in Step 806 of FIG. 8. When the session setting receipt is received from the online information processing means 24, the session control means 21 sends a session setting receipt message having the logical address of the applicable terminal set in the receiver logical address section 42 to the applicable terminal (Step 901). At the same time, the session state of the applicable information areas E1 to En is set to the session setting completion state (Step 902).

Figure 10:
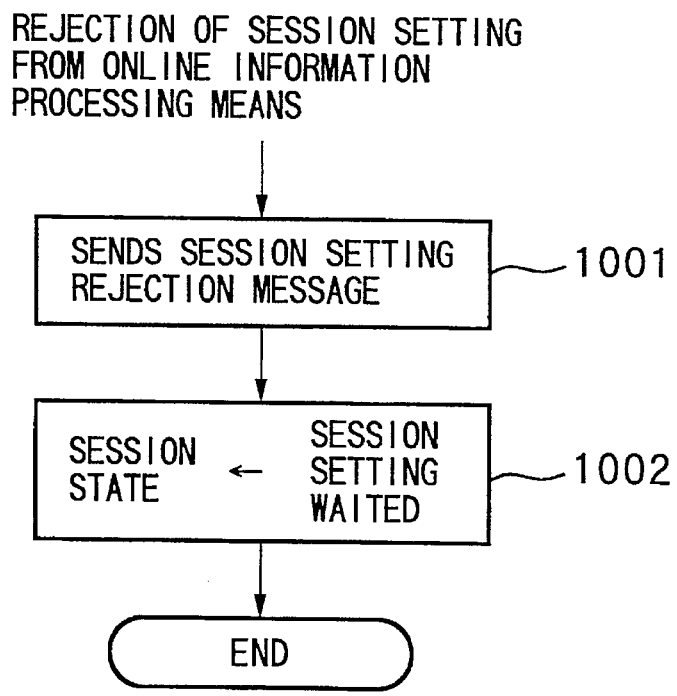
FIG. 10 is a flowchart showing processing of the session control means for the session setting rejection from the online information processing means.

FIG. 10 shows the processing when the session setting rejection is received from the online information processing means 24 which received the session setting request from terminals T1 to Tn in Step 806 of FIG. 8. A case of rejecting the session setting is possible when the information processing volume exceeds the capacity of the online information processing means 24. When the session setting rejection is received from the online information processing means 24, the session control means 21 sends the session setting rejection message having the logical address of the applicable terminal set in the receiver logical address section 42 to the applicable terminal T1 to Tn (Step 1001). At the same time, the session state of the applicable information areas E1 to En is set to the session setting waiting state (Step 1002).

Then, FIG. 11 shows the processing when the session disconnecting request is sent from the online information processing means 24. When the session disconnecting request is received from the online information processing means 24, the session disconnecting request message is sent to the applicable terminal T1 to Tn (designated by the logical address of the session disconnecting request message) which set the session (Step 1101), and the session state of the session state storage area 31 of information areas E1 to En is set to the session disconnecting state (Step 1102).

FIG. 12 shows the processing when the session disconnecting request message is received from one of the terminals T1 to Tn. When the session disconnecting request message is received from one of the terminals T1 to Tn, the session control means 21 checks the session state of information areas E1 to En (Step 1201). As a result, when the session is under disconnecting, in other words, the session state storage area 31 of the information area by the processing of FIG. 11 has its session state under disconnecting, the session is disconnected, and the session disconnecting completion is informed to the online information processing means 24 (Step 1202). At the same time, the session state of the session state storage area 31 of the information area is set to the session setting waiting state (Step 1203).

On the other hand, when the session state of information areas E1 to En is in the session setting completion in the check of Step 1201, the session disconnect request message is sent to the online information processing means 24 (Step 1204). The session state of the applicable session is then set to the session disconnecting state (Step 1205).

Figure 13:
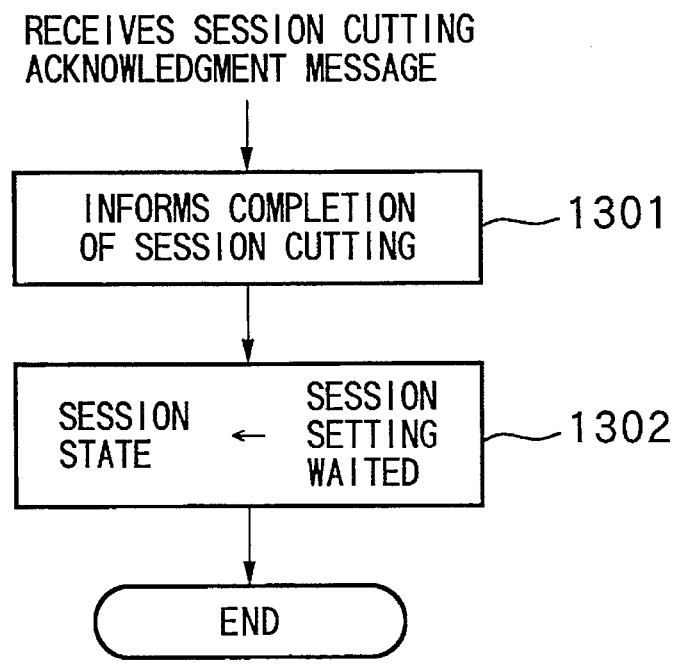
FIG. 13 is a flowchart showing processing of the session control means for the receipt of the session disconnecting request message from a terminal.

When the session disconnect acknowledgment message is received from the applicable terminal T1 to Tn in response to the sending of the session disconnect request message in Step 1101, processing is as shown in FIG. 13. Specifically, the session disconnect completion is given to the online information processing means 24 (Step 1301), and the session state of the applicable session is set to the session setting waiting state (Step 1302).

Figure 14:
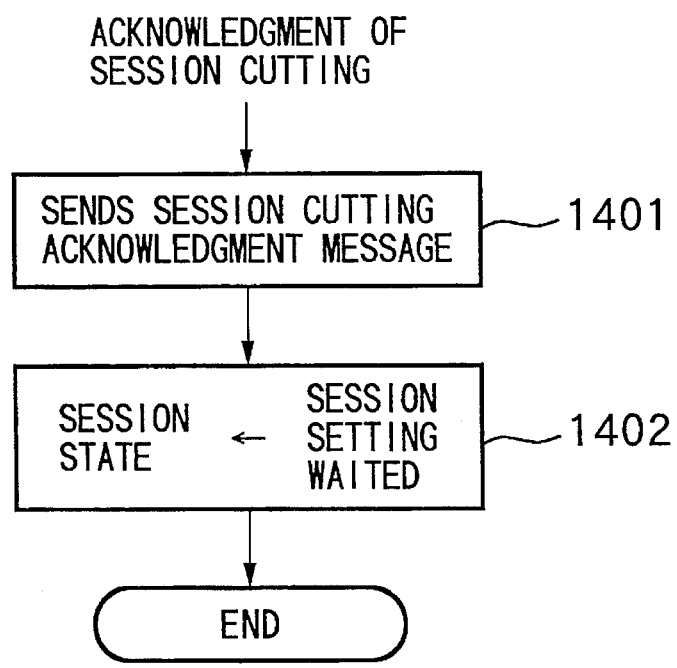
FIG. 14 is a flowchart showing processing of the session control means for the receipt of the session disconnecting acknowledgment from the online information processing means.

To the session disconnect request in Step 1204, when the session disconnect acknowledgment is sent from the online information processing means 24, the session disconnect acknowledgment message is sent as shown in FIG. 14 (Step 1401), and the session state of the applicable session is set to the session setting waiting state (Step 1402).

Figure 15:
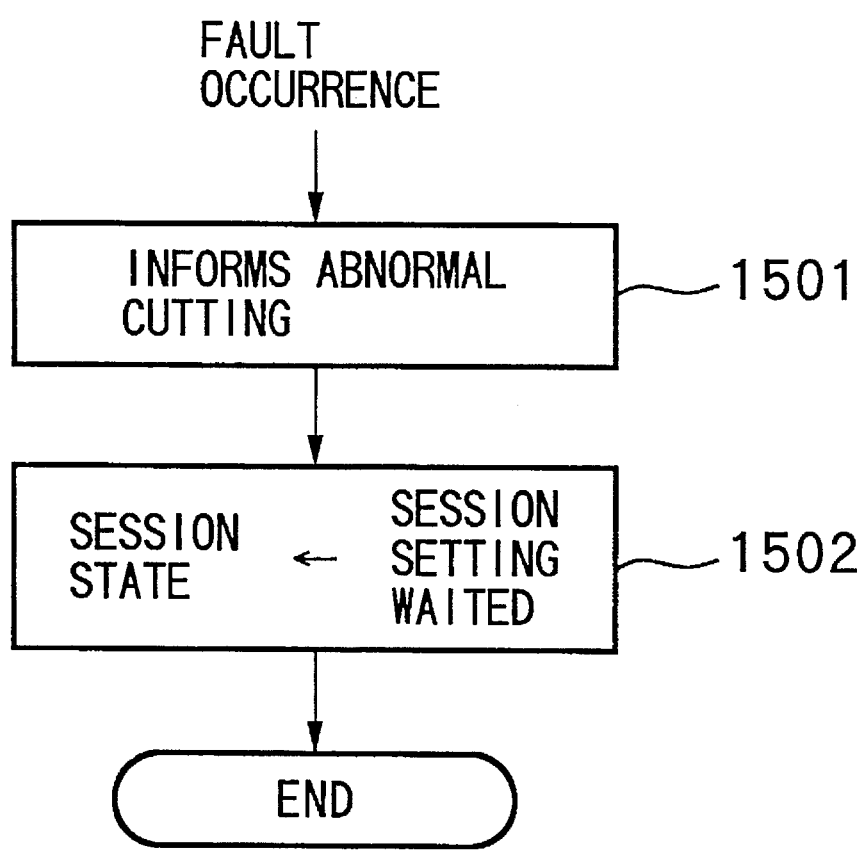
FIG. 15 is a flow chart showing processing of the session control means for the occurrence of line failure.

FIG. 15 shows the processing done for line or link failure. The failure, with the addition of the logical address stored in the terminal logical address storage area 32 in information areas E1 to En of the applicable session, is informed to the online information processing means 24 (Step 1501). Next, whatever state the session of the session state storage area 31 of the information area is, the session state is set to the session setting waiting state (Step 1502).

As described above, according to the online system of this invention, communicating another logical address is not wholly retained statistically, but it is designed to be obtained dynamically from the session setting request message. This message is sent from the online information processing means or a terminal, so the addition of a terminal or the change in the logical address of a terminal does not stop the online system and the session can be set with the terminal. The memory capacity to retain the session control information can be minimized and a highly operable system can be configured. In other words, the memory capacity needed for session control information is kept to a minimum, since information areas of all possible terminals T1 to Tn are not necessary. Rather, only the maximum number of sessions that can be set up simultaneously need be included in the session control information table 22 according to the invention.

For the addition of a new terminals T1 to Tn or a change in the logical address of an existing terminal, the logical address of the terminal obtained at session setting in the session control information table 22 is stored up to the session disconnection. With reference to this session control information table 22, storage of the logical address of the terminals T1 to Tn is checked. All sessions can use this session control information table 22 on a time sharing basis. Thus, it is not necessary to hold all logical addresses of the communicating terminals, and the addition of a new terminal or a change in the logical address of an existing terminal does not require stopping the system.

Needless to say, various modifications can be made to the above embodiments and still keep within the scope of the invention. The present invention should be construed broadly within its spirit and scope as set out in the accompanying claims.

What is claimed is:

1. An online system comprising a host computer and a plurality of terminals connected therewith through communications lines, said host computer comprising:

an online information processing means for processing information by executing an online program;

a session control information table for storing session control information needed for setting and disconnecting of a session and communicating of data with said plurality of terminals, said data indicating a maximum number of sessions which can be set simultaneously based on processing performance of said online information processing means, the session control information including a logical address of each of said plurality of terminals which indicates whether or not the session with said plurality of terminals is set during setting of the session;

a session control means, in response to a session setting request message sent from one of said online information processing means and said plurality of terminals, for setting of a session with said plurality of terminals by storing the logical address of one of said plurality of terminals contained in the session setting request message to one of said session control information which does not indicate a session being set in said session control information table, wherein said online information processing means sends the session setting request message which includes a logical address of one of said plurality of terminals in response to a setting of an active session with said one of said plurality of terminals, and wherein said session control means, in response to a session setting request message that is received from said one of said plurality of terminals, sends a session setting request message with the logical address of said one of said plurality of terminals to said online processing means.

2. An online system according to claim 1, wherein said session control information includes a session state with each of said plurality of terminals, and said session control means further comprises:

a session setting and disconnecting means for setting the session based on said session setting request message, and for disconnecting the session based on said session disconnecting request message, a message sending and receiving means for sending a message to create the session setting request message, and for receiving a message to create the session disconnecting request message, a reference means for referring to the logical address and the session state stored in the information areas of said session control information storage means at a time of either setting or disconnecting of the session, a logical address setting means for setting the logical address of said plurality of terminals contained in said session setting request message in the session control information of said session control information storage means during setting of the session, and a session state setting means for setting a session state information of said plurality of terminals in the session control information of said session control information storage means during setting of the session.

3. An online system according to claim 2, wherein the session state setting means of the session control means sets the session state to one of session setting waiting, session under setting, session setting completed, and session disconnected to the session control information of said session control information storage means, wherein the session control means recognizes the information areas where the session state is set to a waiting state as an unused information state.

4. An online system according to claim 1, wherein a number corresponding to said plurality of session control information of the session control information storage means is equal to a maximum number of sessions which can be set.

5. An online system according to claim 1, wherein said session control information storage table includes an area for storing a session state information and an area for storing a logical address.

6. An online system according to claim 1, wherein the setting/disconnecting request message comprises a sender logical address section for storing a logical address of one of said plurality of terminals and the host computer as a sender of said message, a receiver logical address section for storing a logical address of one of said plurality of terminals and the host computer as a receiver of said message, and a message type section for storing message type information.

7. An online system according to claim 1, wherein the session control information storage table has storage locations corresponding in number to said plurality of session control information of the session control information storage table, said number being equal to one of a maximum number of sessions set simultaneously and a maximum number of sessions judged to be set simultaneously on a basis of processing performance of the online information processing means and the session control information storage table, and wherein the information areas are used exclusively in every session.

8. An online system comprising a host computer and a plurality of terminals connected therewith through communications lines, said host computer comprising:

an online information processing means for processing information by executing an online program;

a session control information table for storing session control information needed for setting and disconnecting of a session and communicating of data with said plurality of terminals, said data indicating a maximum number of sessions which can be set simultaneously based on processing performance of said online information processing means, the session control information including a logical address of each of said plurality of terminals indicating whether or not the session with said plurality of terminals is set during setting of the session; and a session control means, in response to a session setting request message sent from one of said online information processing means and said plurality of terminals, for setting of a session with said plurality of terminals by storing the logical address of one of said plurality of terminals contained in the session setting request message to one of said session control information which does not indicate a session being set in said session control information table, wherein said online information processing means sends the session setting request message which includes a logical address of one of said plurality of terminals in response to a setting of an active session with said one of said plurality of terminals, wherein said session control means, in response to a session setting request message that is received from said one of said plurality of terminals, sends a session setting request message with the logical address of said one of said plurality of terminals to said online processing means, and wherein said session control information includes a session state information with each of said plurality of terminals, said session control means includes,
- a means for referring to the session control information storage table for a presence of a session control information which indicates non-existence of the session is set when a session state request message is received from the online information processing means and, for referring to the session control information storage table for a presence of a session control information which indicates non-existence of the session is set or for a presence of a session control information storing the same logical address as that of one of said plurality of terminals contained in a session setting request message that is received from said one of said plurality of terminals,
- a means for storing the logical address of said one of said plurality of terminals contained in the session setting request message that is received from said one of said plurality of terminals in one of the information areas of said session control information storage means when a session control information area which indicates non-existence of the session exists and for setting the session state information indicating session under setting into the one session control information of said session control information storage table,
- a means for informing a rejection of the session setting to one of said online information processing means and said one of said plurality of terminals when a session control information which has said session state information indicating non-existence of the session does not exist or when rejection of the session setting is received from said online information processing means for the session setting information area,
- a means for setting a session state information indicating completion of a session in a session control information of the session control information storage table when there is a session control information storing the same logical address as that of said one of said plurality of terminals contained in a session setting request message or, when reception of the session setting request message from said online information processing means to a session control information that has a session state information that is under session setting, and
- a checking means, when a session disconnecting request message is received from said one of said plurality of terminals, for checking for a session control information of the session control information storage table that has the same logical address as that of one of said plurality of terminals contained in said session disconnecting request message, when the session state information indicates session under setting, and for setting the session state information to indicate non-existence of the session in said session control information.

9. An online system according to claim 8, wherein said session control means includes:
- a means for storing a state indicating a session being disconnected in an information area of the session control information storage means,
- a means, when a message requesting session disconnecting is received from said one of said plurality of terminals, for checking an information area of the session control information storage means, and when the session state is at a disconnected state, for making the session state into a waiting state, and when the session state is at a completed state, for making the session state to said disconnected state, and
- a means for making the session state of the information area corresponding to the session into said waiting state when a message confirming a session disconnecting is received from the online information processing means.

10. An online system according to claim 8, wherein said session control means is provided with a means to make the session state into said waiting state when a failure occurs in one of the communication lines that is used by the session.

11. An online system comprising a host computer and a plurality of terminals connected therewith through communications lines, said host computer comprising:
- an online information processing means for processing information by executing an online program;
- a session control information table for storing session control information needed for setting and disconnecting of a session and communicating of data with said plurality of terminals which indicates a maximum number of sessions which can be set simultaneously based on processing performance of said online information processing means, the session control information including a logical address of each of said plurality of terminals which indicates whether or not the session with said plurality of terminals is set during setting of the session; and
- a session control means, in response to a session setting request message sent from one of said online information processing means and said plurality of terminals, for setting of a session with said plurality of terminals by storing the logical address of one of said plurality of terminals contained in the session setting request message to one of said session control information which does not indicate a session being set in said session control information table, wherein said online information processing means sends the session setting request message which includes a logical address of one of said plurality of terminals in response to a setting of an active session with said one of said plurality of terminals, wherein said session control means, in response to a session setting request message that is received from said one of said plurality of terminals, sends a session setting request message with the logical address of said one of said plurality of terminals to said online processing means, wherein the session control information storage table corresponds in number to said plurality of session control information of the session control information storage table, said number being equal to one of a maximum number of sessions set simultaneously and a maximum number of sessions judged to be set simultaneously on a basis of processing performance of the online information processing means and the session control information storage table, and wherein said session control information includes a session state information with each of said plurality of terminals, said session control means includes,
- a means for referring to the session control information storage table for a presence of a session control information which indicates non-existence of the session is set when a session state request message is received from the online information processing means and, for referring to the session control information storage table for a presence of a session control information which indicates non-existence of the session is set or for a presence of a session control information storing the same logical address as that of one of said plurality of terminals contained in a session setting request message that is received from said one of said plurality of terminals, a means for storing the logical address of said one of said plurality of terminals contained in the session setting request message that is received from said one of said plurality of terminals in one of the information areas of said session control information storage means when a session control information area which indicates non-existence of the session exists and for setting the session state information indicating session under setting into the one session control information of said session control information storage table, a means for informing a rejection of the session setting to one of said online information processing means and said one of said plurality of terminals when a session control information which has said session state information indicating non-existence of the session does not exist or when rejection of the session setting is received from said online information processing means for the session setting information area, a means for setting a session state information indicating completion of a session in a session control information of the session control information storage table when there is a session control information storing the same logical address as that of said one of said plurality of terminals contained in a session setting request message or, when reception of the session setting request message from said online information processing means to a session control information that has a session state information that is under session setting, and a checking means, when a session disconnecting request message is received from said one of said plurality of terminals, for checking for a session control information of the session control information storage table that has the same logical address as that of one of said plurality of terminals contained in said session disconnecting request message, when the session state information indicates session under setting, and for setting the session state information to indicate non-existence of the session in said session control information.

* * * * *